(12) United States Patent
Ocwieja

(10) Patent No.: US 6,312,309 B1
(45) Date of Patent: Nov. 6, 2001

(54) BOW-HUNTERS HORN RATTLING APPARATUS

(76) Inventor: John D. Ocwieja, 11041 Spring Dr., Clarks Summit, PA (US) 18411

( * ) Notice: Subject to any disclaimer, the term of this patent is extended or adjusted under 35 U.S.C. 154(b) by 0 days.

(21) Appl. No.: 09/671,899

(22) Filed: Sep. 28, 2000

(51) Int. Cl.[7] .................................................. A63H 5/00
(52) U.S. Cl. ............................. 446/397; 446/26; 446/418
(58) Field of Search .............................. 446/26, 397, 404, 446/418

(56) References Cited

U.S. PATENT DOCUMENTS

| | | |
|---|---|---|
| D. 309,120 | 7/1990 | Stewart . |
| 3,757,466 * | 9/1973 | Strelakos . |
| 4,610,641 | 9/1986 | Allen . |
| 4,850,928 | 7/1989 | Stewart . |
| 5,158,494 | 10/1992 | Ball . |
| 5,555,664 | 9/1996 | Shockley . |
| 5,592,689 * | 1/1997 | Matthews . |
| 5,928,056 | 7/1999 | Molotschko . |
| 5,947,353 * | 9/1999 | Johnson . |

* cited by examiner

Primary Examiner—John A. Ricci

(57) ABSTRACT

A bow-hunters horn rattling apparatus for attracting deer by making sound like that of deer horns clashing. The bow-hunters horn rattling apparatus includes a first leghorn assembly including a first elongate support member being adapted to be fastened to one of a user's legs, and also including a first elongate noise maker member being mounted to the first elongate support member, and further including a first boss member being attached to the first elongate noise maker member, and also including first fastening members for fastening the first elongate support member about the user's leg; and also includes a second leghorn assembly including a second elongate support member being adapted to be fastened to another one of the user's legs, and also including a second elongate noise maker member being mounted to the second elongate support member, and further including a second boss member being attached to the second elongate noise maker member, and also including second fastening members for fastening the second elongate support member about the user's leg.

13 Claims, 5 Drawing Sheets

BOW-HUNTERS HORN RATTLING APPARATUS

BACKGROUND OF THE INVENTION

1. Field of the Invention

The present invention relates to a bow-hunters leg horns and more particularly pertains to a new bow-hunters horn rattling apparatus for attracting deer by making sound like that of deer horns clashing.

2. Description of the Prior Art

The use of a bow-hunters leg horns is known in the prior art. More specifically, a bow-hunters leg horns heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,850,928; 5,158,494; 5,928,056; U.S. Pat. No. Des. 309,120; U.S. Pat. Nos. 4,610,641; and 5,555,664.

While these devices fulfill their respective, particular objectives and requirements, the aforementioned patents do not disclose a new bow-hunters horn rattling apparatus. The inventive device includes a first leghorn assembly including a first elongate support member being adapted to be fastened to one of a user's legs, and also including a first elongate noise maker member being mounted to the first elongate support member, and further including a first boss member being attached to the first elongate noise maker member, and also including first fastening members for fastening the first elongate support member about the user's leg; and also includes a second leghorn assembly including a second elongate support member being adapted to be fastened to another one of the user's legs, and also including a second elongate noise maker member being mounted to the second elongate support member, and further including a second boss member being attached to the second elongate noise maker member, and also including second fastening members for fastening the second elongate support member about the user's leg.

In these respects, the bow-hunters horn rattling apparatus according to the present invention substantially departs from the conventional concepts and designs of the prior art, and in so doing provides an apparatus primarily developed for the purpose of attracting deer by making sound like that of deer horns clashing.

SUMMARY OF THE INVENTION

In view of the foregoing disadvantages inherent in the known types of bow-hunters leg horns now present in the prior art, the present invention provides a new bow-hunters horn rattling apparatus construction wherein the same can be utilized for attracting deer by making sound like that of deer horns clashing.

The general purpose of the present invention, which will be described subsequently in greater detail, is to provide a new bow-hunters horn rattling apparatus which has many of the advantages of the bow-hunters leg horns mentioned heretofore and many novel features that result in a new bow-hunters horn rattling apparatus which is not anticipated, rendered obvious, suggested, or even implied by any of the prior art bow-hunters leg horns, either alone or in any combination thereof.

To attain this, the present invention generally comprises a first leghorn assembly including a first elongate support member being adapted to be fastened to one of a user's legs, and also including a first elongate noise maker member being mounted to the first elongate support member, and further including a first boss member being attached to the first elongate noise maker member, and also including first fastening members for fastening the first elongate support member about the user's leg; and also includes a second leghorn assembly including a second elongate support member being adapted to be fastened to another one of the user's legs, and also including a second elongate noise maker member being mounted to the second elongate support member, and further including a second boss member being attached to the second elongate noise maker member, and also including second fastening members for fastening the second elongate support member about the user's leg.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bow-hunters horn rattling apparatus which has many of the advantages of the bow-hunters leg horns mentioned heretofore and many novel features that result in a new bow-hunters horn rattling apparatus which is not anticipated, rendered obvious, suggested, or even implied by any of the prior art bow-hunters leg horns, either alone or in any combination thereof.

It is another object of the present invention to provide a new bow-hunters horn rattling apparatus which may be easily and efficiently manufactured and marketed.

It is a further object of the present invention to provide a new bow-hunters horn rattling apparatus which is of a durable and reliable construction.

An even further object of the present invention is to provide a new bow-hunters horn rattling apparatus which is susceptible of a low cost of manufacture with regard to both materials and labor, and which accordingly is then susceptible of low prices of sale to the consuming public, thereby making such bow-hunters horn rattling apparatus economically available to the buying public.

Still yet another object of the present invention is to provide a new bow-hunters horn rattling apparatus which provides in the apparatuses and methods of the prior art some of the advantages thereof, while simultaneously overcoming some of the disadvantages normally associated therewith.

Still another object of the present invention is to provide a new bow-hunters horn rattling apparatus for attracting deer by making sound like that of deer horns clashing.

Yet another object of the present invention is to provide a new bow-hunters horn rattling apparatus which includes a first leghorn assembly including a first elongate support member being adapted to be fastened to one of a user's legs, and also including a first elongate noise maker member being mounted to the first elongate support member, and further including a first boss member being attached to the first elongate noise maker member, and also including first fastening members for fastening the first elongate support member about the user's leg; and also includes a second leghorn assembly including a second elongate support member being adapted to be fastened to another one of the user's legs, and also including a second elongate noise maker member being mounted to the second elongate support member, and further including a second boss member being attached to the second elongate noise maker member, and also including second fastening members for fastening the second elongate support member about the user's leg.

Still yet another object of the present invention is to provide a new bow-hunters horn rattling apparatus that allows the bow-hunter to take aim while making the noise of deer horns clashing.

Even still another object of the present invention is to provide a new bow-hunters horn rattling apparatus that is easy and convenient to wear and does not obstruct or limit the bow-hunters ability to move about and use ones' bow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
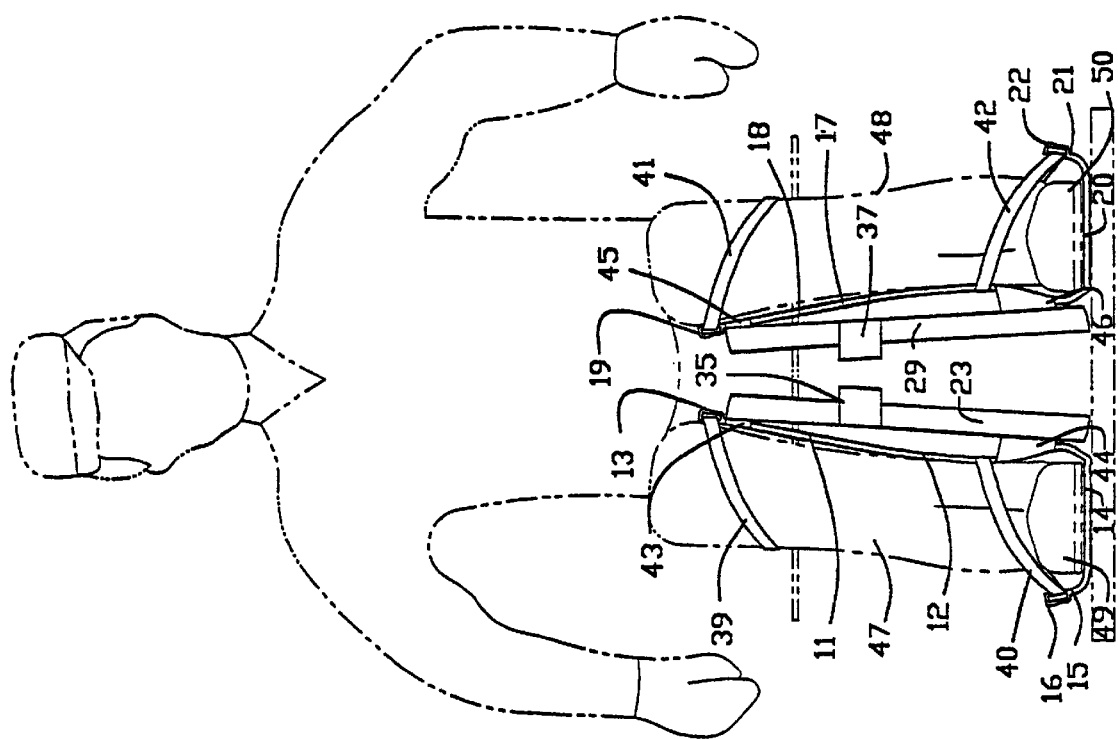
FIG. 1 is a front elevational view of a new bow-hunters horn rattling apparatus according to the present invention and shown in use.
Figure 2:
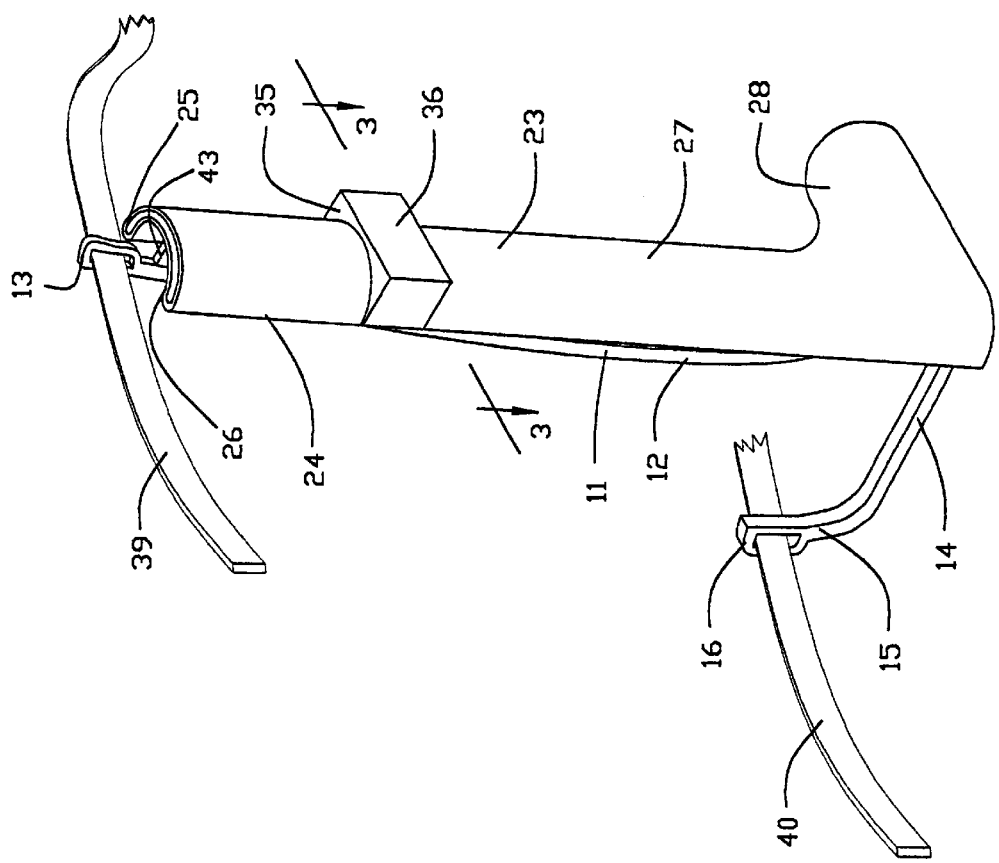
FIG. 2 is a perspective view of one of the leghorn assemblies of the present invention.
Figure 4:
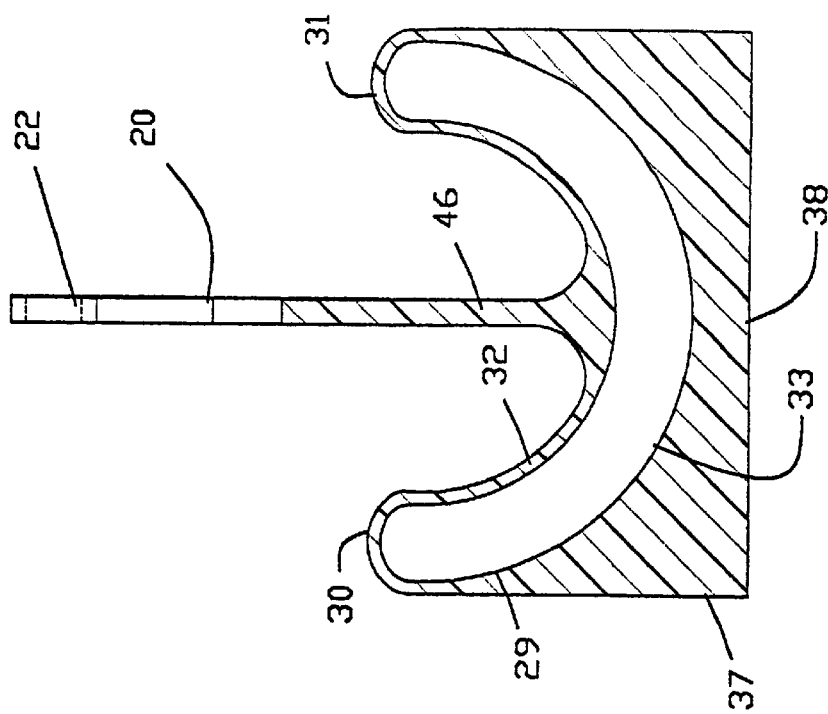
FIG. 4 is a cross-sectional view of another leghorn assembly of the present invention.
Figure 3:
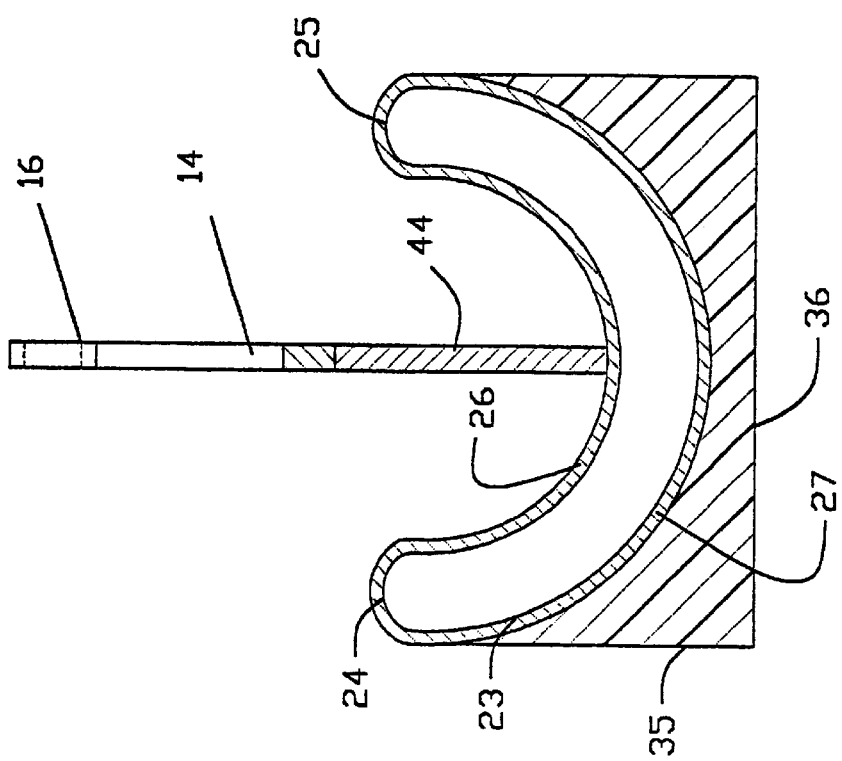
FIG. 3 is a cross-sectional view of one of the leghorn assemblies of the present invention.
Figure 5:
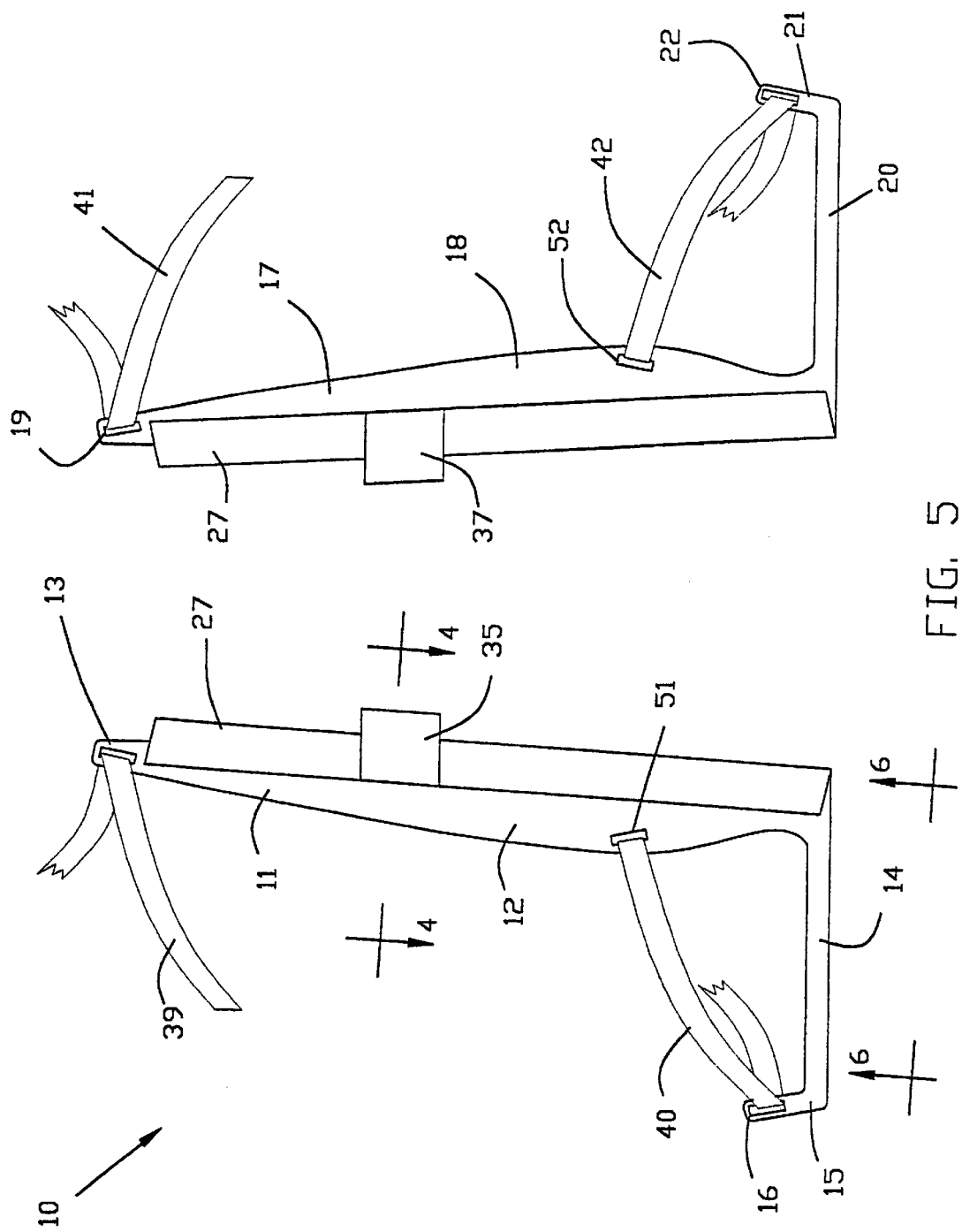
FIG. 5 is a front elevational view of the present invention.
Figure 6:
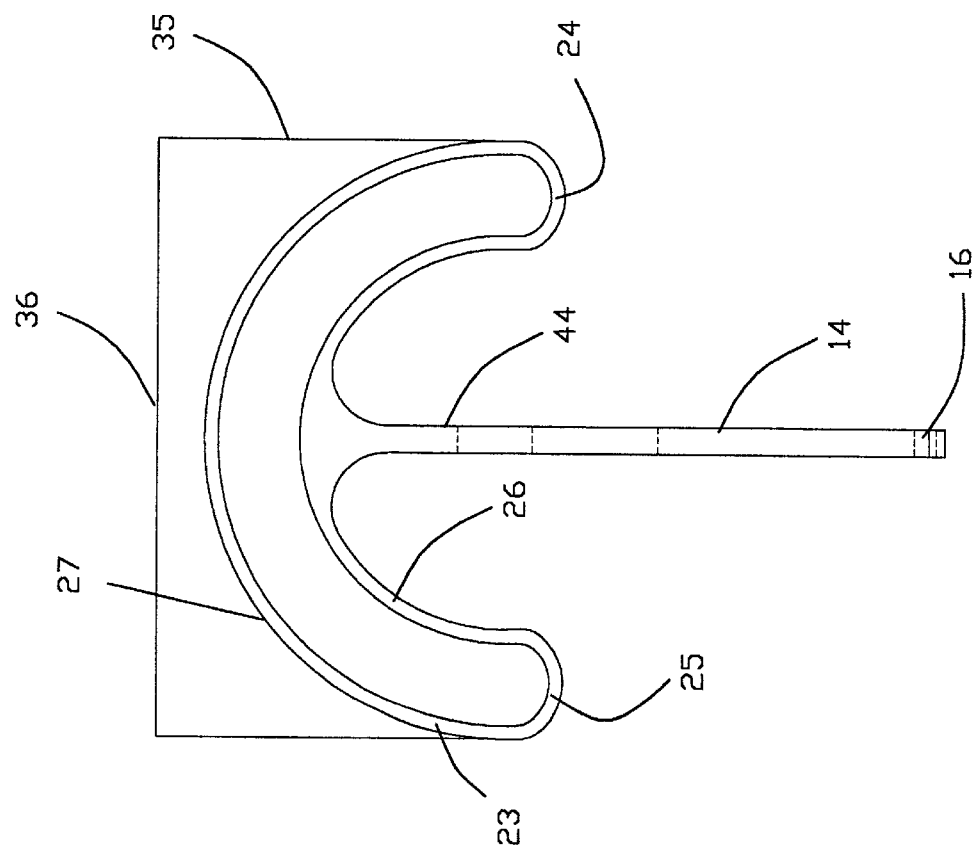
FIG. 6 is a top plan view of one of one of the leghorn assemblies of the present invention.

With reference now to the drawings, and in particular to FIGS. 1 through 6 thereof, a new bow-hunters horn rattling apparatus embodying the principles and concepts of the present invention and generally designated by the reference numeral 10 will be described.

As best illustrated in FIGS. 1 through 6, the bow-hunters horn rattling apparatus 10 generally comprises a first leghorn assembly including a first elongate support member 11 being adapted to be fastened to one of a user's legs 47, and also including a first elongate noise maker member 23 being conventionally mounted to the first elongate support member 11, and further including a first boss member 35 being securely and conventionally attached to the first elongate noise maker member 23, and also including first fastening members 39,40 for fastening the first elongate support member 11 about the user's leg 47; and also comprises a second leghorn assembly including a second elongate support member 17 being adapted to be fastened to another one of the user's legs 48, and also including a second elongate noise maker member 29 being securely and conventionally mounted to the second elongate support member 17, and further including a second boss member 37 being securely and conventionally attached to the second elongate noise maker member 29, and also including second fastening members 41,42 for fastening the second elongate support member 17 about the user's leg 48.

Each of the first and second elongate support members 11,17 has an elongate main portion 12,18 which is adapted to extend along an inside of a respective user's lower leg 47,48, and also has a base portion 14,20 which is securely attached to and extends outwardly from a bottom end of the elongate main portion 12,18 and which is adapted to extend beneath a respective one of the user's feet 49,50. Each of the elongate main portions 12,18 has a top looped end 13,19, and each of the base portions 14,20 has an upwardly curved outer end portion 15,21 and an outer looped end 16,22.

Each of the first and second elongate noise maker members 23,29 is laterally curved and extends along a length of the elongate main portion 12,18 of a respective first and second elongate support member 11,17. The first and second elongate noise maker members 23,29 are adapted to bang together to simulate deer horns clashing of two deer fighting. Each of the first and second elongate noise maker members 23,29 has an inwardly bowed side 26,32 and an outwardly bowed side 27,33. Each of the inwardly bowed sides 26,32 faces a respective elongate support member 11,17. Each of the first and second elongate noise maker members 23,29 has generally a hard shell made of plastic. Each of the first and second elongate noise maker members 23,29 includes a front longitudinal edge 24,30 and a back longitudinal edge 25,31, and also includes a flared extended portion 28 extending outwardly from the back longitudinal edge 25 near a bottom end of the respective first and second elongate noise maker members 23,29.

Each of the first and second boss members 35,37 is securely and conventionally attached to the outwardly bowed side 27,33 of a respective first and second elongate noise maker member 23,29 with each of the first and second boss members 35,37 being disposed intermediate of a top end and the bottom end of a respective first and second elongate noise maker member 23,29. Each of the first and second boss members 35,37 has a flat outer side 36,38 and is adapted to bang with each other to simulate and enhance the sounds made by deer horns banging together of two deer fighting.

The first and second fastening members 39–42 include straps 39–42 being extended through the looped ends 13,16, 19,22 and the slots 51,52 of the first and second elongate support members 11,17 and being adapted to fasten about the user's lower legs 47,48. The first and second leghorn assemblies also includes bracket members 43–46 being securely and conventionally attached to the first and second elongate support members 11,17 and to the first and second elongate noise maker members 23,29.

In use, the user straps the leghorn assemblies about one's lower legs 47,48 with the first and second elongate noise maker members 23,29 facing one another. The user bangs the first and second noise maker members 23,29 together as well as the first and second boss members 35,37 to simulate the noise made by the horns of two deer fighting so that another deer comes within sight of the bow-hunter who is able to take aim with one's bow while making the noise with the leghorn assemblies.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bow-hunters horn rattling apparatus comprising;
a first leghorn assembly including a first elongate support member being adapted to be fastened to one of a user's legs, and also including a first elongate noise maker member being mounted to said first elongate support member, and further including a first boss member being attached to said first elongate noise maker member, and also including first fastening members for fastening said first elongate support member about the user's leg; and
a second leghorn assembly including a second elongate support member being adapted to be fastened to another one of the user's legs, and also including a second elongate noise maker member being mounted to said second elongate support member, and further including a second boss member being attached to said second elongate noise maker member, and also including second fastening members for fastening said second elongate support member about the user's leg.

2. A bow-hunters horn rattling apparatus as described in claim 1, wherein each of said first and second elongate support members has an elongate main portion which is adapted to extend along an inside of a respective user's lower leg, and also has a base portion which is securely attached to and extends outwardly from a bottom end of said elongate main portion and is adapted to extend beneath a respective one of the user's feet.

3. A bow-hunters horn rattling apparatus as described in claim 2, wherein said each of said elongate main portions has a top looped end and a slot disposed therethrough, and each of said base portions has an upwardly curved outer end portion and an outer looped end.

4. A bow-hunters horn rattling apparatus as described in claim 3, wherein each of said first and second elongate noise maker members is laterally curved and extends along a length of said elongate main portion of a respective said first and second elongate support member, said first and second elongate noise maker member being adapted to bang together to simulate deer horns clashing of deer fighting.

5. A bow-hunters horn rattling apparatus as described in claim 4, wherein each of said first and second elongate noise maker members has an inwardly bowed side and an outwardly bowed side, each of said inwardly bowed sides facing a respective said elongate support member.

6. A bow-hunters horn rattling apparatus as described in claim 5, wherein each of said first and second elongate noise maker members is generally a hard shell made of plastic.

7. A bow-hunters horn rattling apparatus as described in claim 6, wherein each of said first and second elongate noise maker members includes a front longitudinal edge and a back longitudinal edge, and also includes a flared extended portion extending outwardly from said back longitudinal edge near a bottom end of said respective first and second elongate noise maker member.

8. A bow-hunters horn rattling apparatus as described in claim 7, wherein each of said first and second boss members is securely attached to said outwardly bowed side of a respective said first and second elongate noise maker member.

9. A bow-hunters horn rattling apparatus as described in claim 8, wherein each of said first and second boss members is disposed intermediate of a top end and said bottom end of a respective said first and second elongate noise maker member.

10. A bow-hunters horn rattling apparatus as described in claim 9, wherein each of said first and second boss members has a flat outer side and is adapted to bang with each other to simulate and enhance the sounds made by deer horns banging together of two deer fighting.

11. A bow-hunters horn rattling apparatus as described in claim 10, wherein said first and second fastening members include straps being extended through said looped ends and said slots of said first and second elongate support members and being adapted to fasten about the user's lower legs.

12. A bow-hunters horn rattling apparatus as described in claim 11, wherein said first and second leghorn assemblies include bracket members being securely attached to said first and second elongate support members and to said first and second elongate noise maker members.

13. A bow-hunters horn rattling apparatus comprising;
a first leghorn assembly including a first elongate support member being adapted to be fastened to one of a user's legs, and also including a first elongate noise maker member being mounted to said first elongate support member, and further including a first boss member being attached to said first elongate noise maker member, and also including first fastening members for fastening said first elongate support member about the user's leg; and a second leghorn assembly including a second elongate support member being adapted to be fastened to another one of the user's legs, and also including a second elongate noise maker member being mounted to said second elongate support member, and further including a second boss member being attached to said second elongate noise maker member, and also including second fastening members for fastening said second elongate support member about the user's leg, each of said first and second elongate support members having an elongate main portion which is adapted to extend along an inside of a respective user's lower leg, and also having a base portion which is securely attached to and extends outwardly from a bottom end of said elongate main portion and which is adapted to extend beneath a respective one of the user's feet, said each of said elongate main portions having a top looped end and a slot disposed therethrough, and each of said base portions having an upwardly curved outer end portion and an outer looped end, each of said first and second elongate noise maker members being laterally curved and extending along a length of said elongate main portion of a respective said first and second elongate support member, said first and second elongate noise maker member being adapted to bang together to simulate deer horns clashing of deer fighting, each of said first and second elongate noise maker members having an inwardly bowed side and an outwardly bowed side, each of said inwardly bowed sides facing a respective said elongate support member, each of said first and second elongate noise maker members being generally a hard shell made of plastic, each of said first and second elongate noise maker members including a front longitudinal edge and a back longitudinal edge, and also including a flared extended portion extending outwardly from said back longitudinal edge near a bottom end of said respective first and second elongate noise maker member, each of said first and second boss members being securely attached to said outwardly bowed side of a respective said first and second elongate noise maker member, each of said first and second boss members being disposed intermediate of a top end and said bottom end of a respective said first and second elongate noise maker member, each of said first and second boss members having a flat outer side and being adapted to bang with each other to simulate and enhance the sounds made by deer horns banging together of two deer fighting, said first and second fastening members including straps being extended through said looped ends and said slots of said first and second elongate support members and being adapted to fasten about the user's lower legs, said first and second leghorn assemblies including bracket members being securely attached to said first and second elongate support members and to said first and second elongate noise maker members.

\* \* \* \* \*